Feb. 28, 1939.  P. HEINISCH ET AL  2,149,218
MOTION PICTURE CAMERA
Filed May 29, 1936
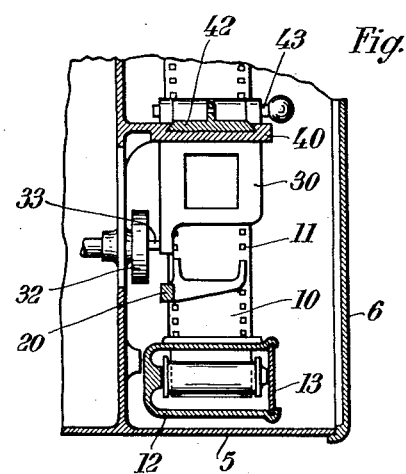
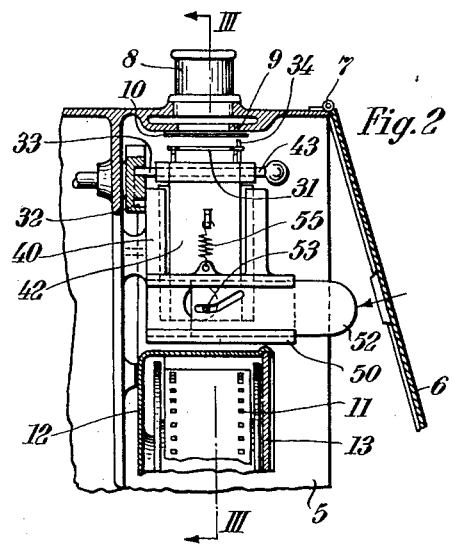
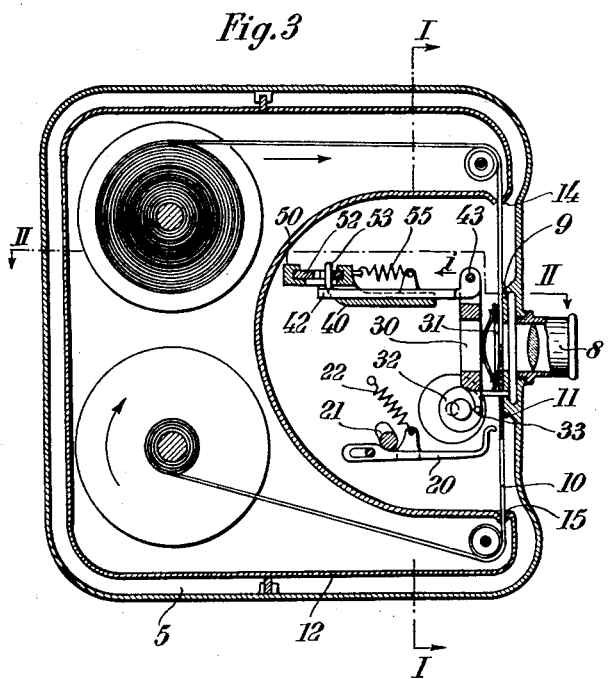
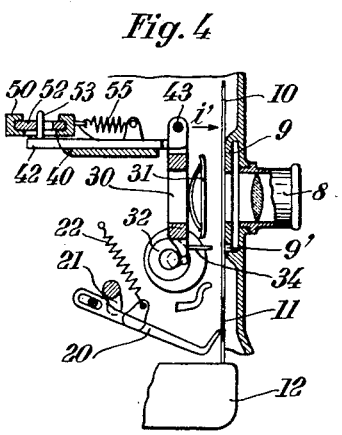
Inventors:
Paul Heinisch
Carl Schencke
by Karl Viertel
Attorney Patented Feb. 28, 1939

2,149,218

UNITED STATES PATENT OFFICE 2,149,218

MOTION PICTURE CAMERA

Paul Heinisch, Berlin-Zehlendorf, and Karl Schencke, Berlin-Tempelhof, Germany

Application May 29, 1936, Serial No. 82,555
In Germany June 6, 1935

6 Claims. (Cl. 88—18)

Our invention relates to improvements in motion picture cameras of the type, wherein the sensitized film is enclosed in a film-box or magazine, the latter being removably mounted in the camera and adapted to be exchanged at a moment's notice in daylight for another one containing a fresh film,—and wherein the perforated film on being intermittently advanced across the exposure aperture of the camera, passes a guide plate surrounding said exposure aperture and a rocking film gate cooperatively associated with said guide plate and adapted to alternately frictionally arrest and set free said film.

As a matter of fact known to film reporters and other practitioners using motion picture cameras of the type set forth, the camera man—photographing rapidly moving actions and endeavouring to speed up the re-charging operation in order not to loose valuable exposure time—is often handicapped and irritated because of the delicate nature of the film, of which—on re-charging the camera—the section to be exposed first must be carefully threaded through a narrow cap formed by said film gate and the opposed guide plate, which surrounds the exposure aperture of the camera.

The principal object of our invention is to overcome the said drawback by providing a structurally improved film gate, which presents in its open or inoperative position—viz. ready to receive the fresh film to be inserted—a gap of ample width, much wider than with motion picture cameras of known design.

In connection therewith the invention aims at so cooperatively associating the film gate structure and the camera door, through which the film boxes are withdrawn and inserted, that on opening said door the film gate is automatically thrown into its inoperative, widely open position allowing of readily replacing the exposed film by a fresh one.

Another salient feature of the invention consists in providing at the film gate proper in addition to friction pads a checking device for keeping firmly and truly arrested the exposed section of the film during the exposure so as to positively prevent any staggering or flickering of the latter, which would impair the sharp definition of the pictures taken.

Other objects aimed and advantages obtained will become evident hereinafter.

The nature and scope of the invention are briefly outlined in the appended claims and will be more fully understood from the following specification taken together with the accompanying drawing, in which an embodiment of the invention is shown by way of an example:

Fig. 1 being a section vertically taken through the structurally improved camera on a plane indicated by line I—I in Fig. 3, and being seen in the direction of the arrows, Fig. 2 is a section horizontally taken through the camera on line II—II in Fig. 3, Fig. 3 is a another section vertically taken on line III—III in Fig. 2, and showing the film gate in its operative position, arresting the sensitized film, Fig. 4 is a replica of Fig. 3, wherein the film gate is shown in its rearmost idle position, ready for the reception of a fresh film.

With the objects in view outlined above the motion picture camera structurally improved according to this invention and diagrammatically shown by way of an example in the drawing comprises:

(1) A camera casing 5 having a door 6, which is hinged to the casing at 7, an exposure lens 8, and an exposure aperture, which is surrounded by a guide plate 9;

(2) A sensitized perforated film 10 enclosed in a box or magazine 12, wherein the film is wound up and rewound; the section of the film to be exposed leaves the magazine and re-enters same through narrow slots indicated at 14—15, which are conveniently lined with velvet strips for excluding the light, while the magazine is outside the camera;—the magazine 12 is loaded in the dark room as shown in Fig. 3, and when the cover 13 is applied, it is then ready to be placed into the camera in daylight;

(3) A feeding mechanism for intermittently advancing the film, which comprises a reciprocating claw 20, which may be conveniently actuated by a rotary cam 21 and spring 22, and engages the perforations 11 of the film as seen in Fig. 4;

(4) A rocking film gate 30 fitted with pressure pads 31 resiliently mounted thereon for frictionally engaging and disengaging the exposed section of the film; the rocking motion is preferably applied to the film gate 30 by means of a rotary excentric 32 cooperatively associated with a pin 33, which is provided at the lower end of the film gate 30.

According to this invention—and in contradistinction to motion picture cameras of known design—the said film gate 30 is pivotally attached at 43 to a displacing mechanism under the operator's control, adapted to reciprocate the film gate 30 namely moving it away from the guide plate 9, so as to widen the passage therebetween for the film 10;—the wider passage seen in Fig. 4 will eliminate any cumbersome and time consuming threading operations with the film and enables the camera man to more rapidly exchange the magazine 12 containing the exposed film for another magazine containing a fresh film.

In the embodiment of the invention shown in the drawing by way of an example the said displacing mechanism comprises:

A primary guide bed 40, fixed in the camera casing 5, and a primary guide block 42, to which the film gate 30 is pivoted at 43, and which is slidably associated with said primary guide bed, and Means for shifting said primary guide block 42 to and fro, as indicated by arrows i—i' in Figs. 3 and 4, which comprise:

A secondary guide bed 50 arranged at right angles to the primary one, a secondary guide block 52 slidably associated with said secondary guide bed 50, a pin and slot gear designated 53 interengaging said primary and secondary guide blocks 42, 52, a spring 55 attached to said primary guide block 42 for positively shifting the latter jointly with the secondary guide block 52 and the film gate 30 into their idle position seen in Figs. 2 and 4;—and Actuating means for pushing home the guide blocks 42, 52 against the action of spring 55 and thus restoring the film gate into its operative position shown in Fig. 3—said actuating means comprise:

The camera door 6, referred to above, which is hinged to the camera casing 5 and is cooperatively associated with said secondary guide block 52 so as to engage the latter before the door is fully closed,—as seen in Fig. 2, which is otherwise self-explanatory. Various changes and modifications may be conveniently made in the structural details of motion picture cameras of the improved design described, and in the assemblage and cooperation of their component parts,— without substantially departing from the spirit and the salient ideas of this invention.

Checking means may be provided to advantage at the film gate 30 proper for positively and truly arresting the exposed section of the sensitized film 10 so as to avoid any staggering of flickering motions of the film, which might occur as the result of vibrations and the like in the camera, and might impair the correct definition of the pictures taken; said checking means comprise:

A hole 9' provided in guide plate 9 and a pin 34 attached to the film gate 30 so as to register with said hole 9' and the respective holes 11 in the perforated film 10, as seen in Figs. 3-4, which are self-explanatory as to the working of said checking means.

We claim:

1. In a camera for taking motion pictures on a sensitized film, the combination with a guide plate surrounding the exposure aperture of the camera, of a film gate hinged opposite said guide plate for co-operation therewith, means for rocking said film gate through a relatively small angle in rhythm with means intermittently advancing the film, and a displacing mechanism secured to the hinge of said film gate for spacing the latter from said guide plate and restoring it into its operative position.

2. In a camera for taking motion pictures on a sensitized film, the combination with a guide plate surrounding the exposure aperture of the camera, of a film gate hinged opposite said guide plate for cooperation therewith, means for rocking said film gate through a relatively small angle in rhythm with means intermittently advancing the film, a displacing mechanism secured to the hinge of said film gate for spacing the latter from said guide plate and restoring it into its operative position, registering pins attached to said film gate and engaging the perforation of the film for checking and adjusting the latter in the exposure aperture of the camera, and holes provided in said guide plate co-operating with the film gate.

3. In a camera for taking motion pictures on a sensitized film, the combination with a guide plate surrounding the exposure aperture of the camera, of a film gate hinged opposite said guide plate for co-operation therewith, means for rocking said film gate through a relatively small angle in rhythm with means intermittingly advancing the film, and a displacing mechanism secured to the hinge of said film gate for spacing the latter from said guide plate and restoring it into its operative position, said displacing mechanism being loaded by a spring and co-operating with the door of the camera.

4. In a camera for taking motion pictures on a sensitized film, the combination with a guide plate surrounding the exposure aperture of the camera, of a film gate hinged opposite said guide plate for cooperation therewith, means for rocking said film gate through a relatively small angle, and a displacing mechanism secured to the hinge of said film gate for spacing the latter from said guide plate and restoring it into its operative position,—said displacing mechanism comprising a primary guide bed fixed in the camera casing, a block to which the film gate is pivoted and which is slidably mounted in said guide bed, and means for shifting said block to and fro.

5. In a camera for taking motion pictures on a sensitized film, the combination with a guide plate surrounding the exposure aperture of the camera, of a film gate hinged opposite said guide plate for cooperation therewith, means for rocking said film gate through a relatively small angle, a displacing mechanism secured to the hinge of said film gate for spacing the latter from said guide plate and restoring it into its operative position, said displacing mechanism comprising a primary guide bed fixed in the camera casing, a block to which the film gate is pivoted and which is slidably mounted in said guide bed, and means for shifting said block to and fro,—said shifting means comprising a secondary guide bed arranged at right angles to the primary one, a secondary guide block slidably associated with said secondary guide bed, a pin and inclined slot gear interengaging said primary and secondary guide blocks, a spring attached to said primary guide block, and actuating means under the operator's control for pushing home said guide blocks against the action of said spring.

6. In a camera for taking motion pictures on a sensitized film, the combination with a guide plate surrounding the exposure aperture of the camera, of a film gate hinged opposite said guide plate for cooperation therewith, means for rocking said film gate through a relatively small angle, and a displacing mechanism secured to the hinge of said film gate for spacing the latter from said guide plate and restoring it into its operative position, said displacing mechanism comprising a primary guide bed fixed in the camera casing, a block to which the film gate is pivoted and which is slidably mounted in said guide bed, and means for shifting said block to and fro, said shifting means comprising a secondary guide bed arranged at right angles to the primary one, a secondary guide block slidably associated with said secondary guide bed, a pin and inclined slot gear interengaging said primary and secondary guide blocks, a spring attached to said primary guide block, and actuating means under the operator's control for pushing home said guide blocks against the action of said spring,—said actuating means comprising a door, for cooperation with secondary guide block, so as to engage the latter, before the door is fully closed.

PAUL HEINISCH.
KARL SCHENCKE.